(12) United States Patent
Zhu et al.

(10) Patent No.: US 12,205,264 B2
(45) Date of Patent: Jan. 21, 2025

(54) SYSTEM AND METHOD FOR EXTRACTING AND MEASURING SHAPES OF OBJECTS HAVING CURVED SURFACES WITH A VISION SYSTEM

(71) Applicant: Cognex Corporation, Natick, MA (US)

(72) Inventors: Hongwei Zhu, Natick, MA (US); Daniel Moreno, Northbridge, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 17/503,220

(22) Filed: Oct. 15, 2021

(65) Prior Publication Data

US 2022/0148153 A1 May 12, 2022

Related U.S. Application Data

(60) Provisional application No. 63/092,438, filed on Oct. 15, 2020.

(51) Int. Cl.
*G06T 7/00* (2017.01)
*G06T 3/067* (2024.01)
*G06V 10/46* (2022.01)

(52) U.S. Cl.
CPC ............ *G06T 7/0004* (2013.01); *G06T 3/067* (2024.01); *G06V 10/46* (2022.01); *G06T 2207/10028* (2013.01)

(58) Field of Classification Search
CPC ........... G06T 19/00; G06T 2207/10081; G06T 2207/10088; G06T 2207/30021;
(Continued)

(56) References Cited

U.S. PATENT DOCUMENTS 7,404,645 B2 7/2008 Margulis
8,774,558 B2 7/2014 Zhang
(Continued)

FOREIGN PATENT DOCUMENTS

CN 111229648 A * 6/2020
EP 2110656 B1 7/2011

OTHER PUBLICATIONS

Igor Jovancevic, "3D Point Cloud Analysis for Detection and Characterization of Defects on Airplane Exterior Surface", Journal of Nondestructive Evaluation, vol. 36, 2017.
(Continued)

*Primary Examiner* — Ming Wu
(74) *Attorney, Agent, or Firm* — Loginov & Associates, PLLC; William A. Loginov

(57) ABSTRACT

This invention provides a system and method that efficiently detects objects imaged using a 3D camera arrangement by referencing a cylindrical or spherical surface represented by a point cloud, and measures variant features of an extracted object including volume, height, and center of mass, bounding box, and other relevant metrics. The system and method, advantageously, operates directly on unorganized and un-ordered points, requiring neither a mesh/surface reconstruction nor voxel grid representation of object surfaces in a point cloud. Based upon a cylinder/sphere reference model, an acquired 3D point cloud is flattened. Object (blob) detection is carried out in the flattened 3D space, and objects are converted back to the 3D space to compute the features, which can include regions that differ from the regular shape of the cylinder/sphere. Downstream utilization devices and/or processes, such as part reject mechanism and/or robot manipulators can act on the identified feature data.

20 Claims, 15 Drawing Sheets

(58) Field of Classification Search
CPC ....... G06T 2207/30048; G06T 2210/41; G06T 2219/021; G06T 3/0037; G06T 3/0062; G06T 7/0012

See application file for complete search history.

(56) References Cited

U.S. PATENT DOCUMENTS

| | | | |
|---|---|---|---|
| 9,033,238 B2 | 5/2015 | Davis | |
| 9,183,666 B2 | 11/2015 | Kontkanen | |
| 9,367,940 B2* | 6/2016 | Weng | G06V 40/171 |
| 9,600,982 B2 | 3/2017 | MacIntosh | |
| 9,609,307 B1 | 3/2017 | Lopez | |
| 10,052,900 B2 | 8/2018 | Kamijo | |
| 10,089,737 B2 | 10/2018 | Krieger | |
| 10,217,235 B2 | 2/2019 | Ludwig | |
| 11,069,117 B2 | 7/2021 | Ford | |
| 11,164,394 B2 | 11/2021 | Gausebeck | |
| 2010/0211360 A1* | 8/2010 | Ratti | G06F 30/20 |
| | | | 703/2 |
| 2015/0310601 A1 | 10/2015 | Rodriguez | |
| 2016/0033368 A1 | 2/2016 | Neau | |
| 2016/0364634 A1 | 12/2016 | Davis | |
| 2017/0244908 A1* | 8/2017 | Flack | G11B 27/036 |
| 2019/0302963 A1* | 10/2019 | Harrison | G06V 40/28 |
| 2020/0286225 A1* | 9/2020 | Ben-Haim | G06T 19/00 |

OTHER PUBLICATIONS

Van-Tho Nguyen, "Segmentation of defects on log surface from terrestrial lidar data", 23rd International Conference on Pattern Recognition (ICPR), 2016.

"Leaders in 3D Scanning and Inspection", LMI Product Brochure, 2020.

* cited by examiner

SYSTEM AND METHOD FOR EXTRACTING AND MEASURING SHAPES OF OBJECTS HAVING CURVED SURFACES WITH A VISION SYSTEM

RELATED APPLICATIONS

This application claims the benefit of U.S. Provisional Application Ser. No. 63/092,438, filed Oct. 15, 2020, entitled SYSTEM AND METHOD FOR EXTRACTING AND MEASURING SHAPES OF OBJECTS HAVING CURVED SURFACES WITH A VISION SYSTEM, the entire disclosure of which is herein incorporated by reference.

FIELD OF THE INVENTION

This invention relates to machine vision systems that generate 3D (e.g. point cloud) image data and process such data to determine and evaluate the shapes of imaged objects.

BACKGROUND OF THE INVENTION

Machine vision systems (also termed herein "vision systems") are used in a variety of manufacturing and industrial processes. Typically a vision system employs one or more cameras that generate 2D or 3D image data of an object of interest in a scene. The image data can be derived using a variety of modalities, including stereoscopic cameras, time of flight sensors, LIDAR, etc. One form of image data is the 3D point cloud, which is defined by a set of data points in space, which represent a 3D shape or object. By way of example, each point has its set of spatial coordinates in a prevailing coordinate space—for example Cartesian x, y and z coordinates. The vision system process(or), which is/are associated with the camera(s), derives shape information based upon the point cloud data. The information can be used to determine the dimensions, identification, quality, pose and/or location of the object.

Detecting objects above, below, missing, or aligned with a curved (reference) surface and evaluating their properties are popular inspection applications, e.g., detecting defects on a surface for any protrusions, dent and/or missing holes. For such applications, a 3D point cloud can offer a more appropriate representation of object surfaces than a 2D image (which is known sensitive to lighting conditions).

Typical vision system blob analysis tools, such as those available from Cognex Corporation of Natick, MA, are adapted to detect objects and measure their features (e.g., volume and height/depth, orientation, etc.) by referencing a planar surface of a point cloud. Such tools may be unable to reliably perform these operations when there are deformations above or below a curved surface, e.g., to identify whether there is any dents or scratches on the cylindrical surface (for example a disposable battery), or on the spherical surface (such as a golf or ping pong ball).

A technique for detecting blobs on images of curved surfaces typically entails a mesh/surface reconstruction, which may be inefficient for a processing arrangement to undertake, and therefore unsuitable for real-time applications. Such an approach can also experience difficulties identifying small and/or miniscule features on such curved surfaces.

It is, therefore, desirable to provide a system and method that more effectively allows defects and other 3D features to be identified and evaluated with respect to various types of curved surfaces, such as cylinders and spheres.

SUMMARY OF THE INVENTION

This invention overcomes disadvantages of the prior art by providing a system and method that efficiently detects objects imaged using a 3D camera arrangement by referencing a cylindrical or spherical surface represented by a point cloud, and measures variant features of an extracted object including volume, height, and center of mass, bounding box, and other relevant metrics. The system and method, advantageously, operates directly on unorganized and unordered points, requiring neither a mesh/surface reconstruction nor voxel grid representation of object surfaces in a point cloud. Based upon a cylinder or sphere reference model, an acquired 3D point cloud is flattened along the cylindrical or spherical surface (i.e., surface tangent direction). Object (blob) detection is carried out in the flattened 3D space, and then the detected objects are converted back to the original 3D space to compute the object features. Such features can include regions that differ from the regular shape of the cylindrical or spherical surface, thus potentially representing defects or other features of interest. Downstream utilization devices and/or processes, such as part reject mechanism and/or robot manipulators can act on the identified feature data.

In an illustrative embodiment a system and method for detecting and measuring features relative to curved surfaces from a 3D point cloud imaged by a 3D vision system camera assembly is provided. An extraction process can identify the curved surface in 3D space and can provide a reference model relative to the curved surface. A flattening process can flatten the curved surface into a flattened, planar shape in accordance with the reference model, and a feature location process can locate features on the planar shape. A mapping process can convert the located features into the 3D space, and a feature output process can report the features relative to the curved surface. Illustratively, the feature location process can employ a blob analysis tool. The curved surface can be cylindrical surface or a spherical surface and the reference model, respectively, can comprise a cylinder or a sphere. The curved surface can comprise one or more regions that appear monotonic when viewed from an outward radial direction of an axis of the cylinder or the a center of the sphere superimposed thereon. The flattening process can be adapted to flatten the curved surface along surface tangent direction. Illustratively, the flattening process can divide the planar surface (in which the 3D points of the curved surface reside) into a grid based upon orthogonal axes defining azimuth and height on a cylinder or azimuth and tilt on a sphere. A feature identification process can identify features differing from a normal surface geometry of the curved surface, and the differing features can comprise object defects or locations upon which downstream utilization operations can occur on the object. An optional reference surface refinement process can be employed to adapt the reference surface to 3D points representing the planar surface.

BRIEF DESCRIPTION OF THE DRAWINGS

The invention description below refers to the accompanying drawings, of which.

DETAILED DESCRIPTION

I. SYSTEM OVERVIEW

Figure 1:
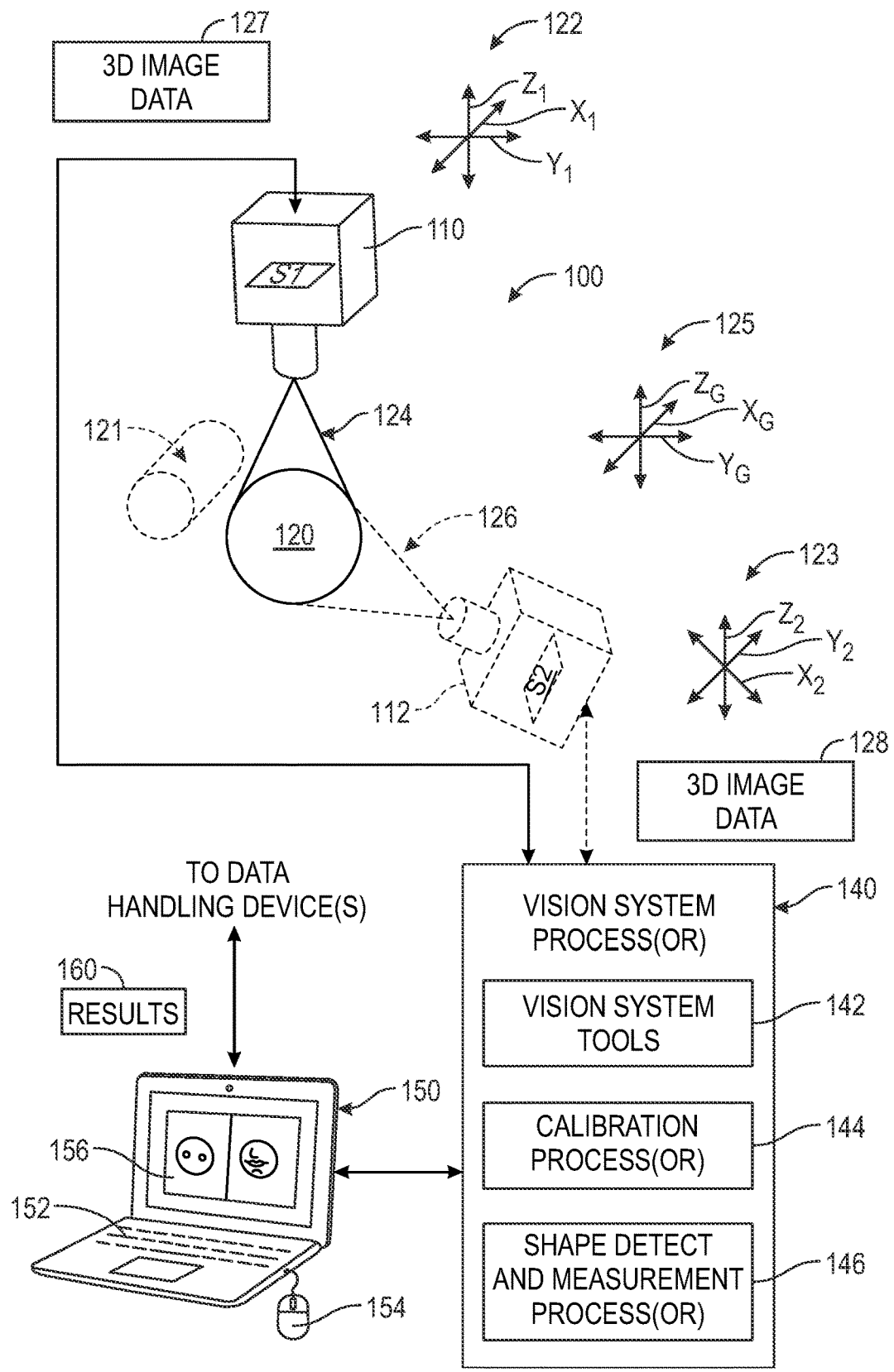
FIG. 1 is a diagram of an overall vision system arrangement acquiring one or more 3D images of an exemplary spherical object for use in evaluating the shape of the object in accordance with an exemplary embodiment.

FIG. 1 shows a vision system arrangement 100 consisting of one or more (a plurality) of cameras 1-N (110, 112) which acquire an image of one or more sides of an object—for example a sphere 120—according to an exemplary embodiment. In an alternate arrangements, a cylindrical shape 121 (shown in phantom) can be imaged instead of, or in addition to, a sphere 120. More generally, the imaged object can contain a range of (typically) curved topography, and the principles described herein can be applied to parse the curved surface into fitted cylindrical and/or spherical shapes.

The camera(s) 110 and 112 are arranged to acquire an image of some or all of the calibration object 120 in the overall scene. The object 120 is shown within the field(s) of view (FOV) 124 and 126 of the respective camera(s) 110 and 112. Note that the camera 112 is shown in phantom as it is optional. In an embodiment the single 3D camera 110 can be employed to generate 3D image data (e.g. a 3D point cloud). In alternate embodiments, one or more additional cameras can also be employed to image the object 120 from additional points of view. This can be desirable in applications wherein part of the object is obscured and/or a full-360-degree image of the object is desired. As described below, the vision system process(or) 140 can register 3D image data 127 and 128 from each respective 3D camera assembly 110 and 112 to generate a complete 3D point cloud representation of the object 120. The registration of image data from multiple cameras can entail transforming the 3D image data 127 and 128 from each camera's local coordinate system (each shown as exemplary, orthogonal (Cartesian), x, y and z axes) 122 ($X_1$, $Y_1$, $Z_1$) and 123 ($X_2$, $Y_2$, $Z_2$) into a global coordinate system 125 ($X_G$, $Y_G$, $Z_G$). Associated rotations can be defined about the axes as appropriate. The cameras 110, 112 can be calibrated using an appropriate calibration object to provide transformation data for use in registering 3D images. A calibration process(or) 144, which is part of the overall vision system process(or) 140 is described further below. Note that the vision system camera assembly/ies 110, 112 can be based upon any appropriate 3D imaging technology, or combination of technologies, including, but not limited to, laser displacement sensors, stereoscopic camera(s), LIDAR-based (more generally, range-finding) camera(s), time-of flight camera(s), etc.

As described above, the 3D camera(s) 110 and 112 each include a respective image sensor S1 and S2 that transmits image data to one or more internal or external vision system processor(s) 140, that carry out appropriate 3D vision system processes using functional modules, processes and/or processors. By way of non-limiting example, the modules/processes can include a set of exemplary vision system tools 142 that find and analyze features in the image—such as edge finders and contrast tools, blob analyzers, calipers, range finders, etc. The vision system tools 142 interoperate with a calibration module/process 144 that performs calibration and establishes 3D relationships between the 3D target and the one or more cameras, represented in a common/global coordinate space (e.g. characterized the depicted global coordinate system 125). Other types of coordinate systems—such as polar coordinates—can be employed to characterize the 3D image space in alternate embodiments, and can be employed to derive certain measurements and computations as described below. The vision system process (or) 140 can also include a shape detection and measurement process(or) 146 that carries out the tasks of the system and method as described further below—that is determining and evaluating (e.g. scoring) an imaged object shape, such as a cylinder and/or sphere.

The processor 140 can be instantiated in a custom circuit or can be provided as hardware and software in a general purpose computing device 150 as shown. This computing device 150 can be a cloud computing arrangement, a server, PC, laptop, tablet, smartphone, and/or any other acceptable data processing implementation. The computing device can include a user interface—for example a keyboard 152, mouse 154, and/or display/touchscreen 156. The computing device 150 can reside on an appropriate communication network (e.g. a WAN, LAN) using a wired and/or wireless link. This network can connect, and provide results 160, to one or more data handling device(s), including a robot/end effector controller, part rejection system, logistics process, etc.

II. EVALUATION AND MEASUREMENT OF SPHERICAL AND CYLINDRICAL SHAPES

The system and method of the exemplary embodiment herein is arranged to detect deformations (protrusions, dents, missing holes and presence) from 3D point clouds relative to a curved surface which is either accurately or roughly represented by a geometry shape cylinder or sphere, and extract blobs as means to represent these deformations. Once the cylindrical and/or spherical shape is identified, features of the extracted blob results are provides, which can include detents, dents, dimples, protrusions and/or other erroneous (or intended) structures on the curved surface(s).

A. General Procedure

Figure 2:
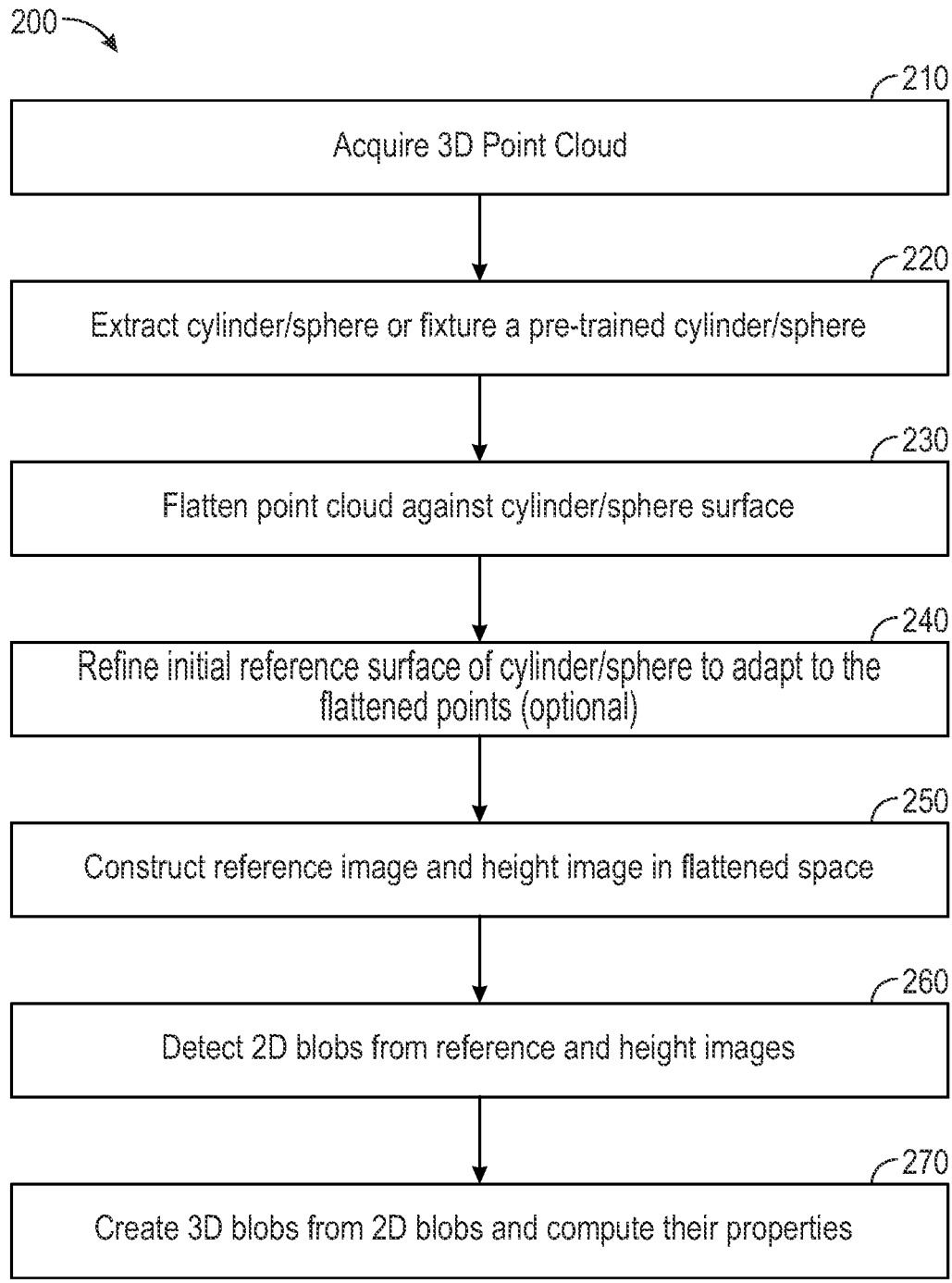
FIG. 2 is a flow diagram showing an overall procedure for acquiring and evaluating 3D point clouds of cylindrical and spherical objects according to an exemplary embodiment.

Reference is made to FIG. 2, which shows a flow diagram of an overall procedure 200 for evaluating an acquired and/or stored 3D point cloud for cylindrical or spherical shapes, and extracting blobs to identify 3D defects or other features therein.

Briefly, in step 210 of the procedure 200, the camera assembly/ies acquires and/or provides a stored 3D point cloud representing a 3D image of an object containing at least one cylindrical and/or spherical shape. In step 220, the procedure obtains a reference shape (a cylinder or sphere). More particularly, the system and method extracts the points associated with a cylindrical or spherical shape or uses tools to fixture a pre-trained cylinder or sphere shape (i.e. applying vision system trained pattern recognition processes). Then, in step 230 of the procedure 200 a reference surface (of the cylinder or sphere) is flattened to construct a flattened coordinate space (termed herein "Flattened3D"). The technique for flattening the coordinate space is described further below with reference to FIGS. 3-6. Each point in the region of interest (ROI) is then mapped from input client 3D space (termed herein "Client3D") to the flattened space. This entails quantizing each points' X and Y components and binning them to form an X-Y grid, termed herein "QuantizedFlattened3D". Optionally, (step 240) the initial reference surface for the cylinder or sphere is refined to adapt to the flattened reference points.

In step 250 of the procedure 200, a reference image and a height image are constructed in the flattened space. This can be accomplished using the optionally refined initial reference surface from step 240. Then, in step 260, the procedure 200 applies a connected-component analysis process/algorithm to detect 2D blobs (based on the reference image and the height image) in the QuantizedFloatted3D space, and gathers necessary information required to compute the properties of a 3D blob (e.g., occupied bins and their Z spans). Next, the procedure 200 converts 2D blobs from QuantizedFlattened3D back to Client3D, and computes the properties of each blob result in the original Client3D space in step 270.

By way of further detail of the procedure 200, after acquiring a 3D point cloud (step 210) of an object that contains a cylindrical and spherical shape using the camera assembly/ies, a reference cylinder or sphere is obtained first, by either extracting it (step 220) from the point cloud using appropriate vision tools (142 in FIG. 1), for example a specialized cylinder or sphere extraction tool that searches for point clouds having an approximate contour—such as the cylinder/sphere extractor available from Cognex Corporation of Natick, MA. Alternatively, the cylinder or sphere can be extracted via fixturing from a pre-trained model (e.g., using the pose obtained from a 3D alignment tool, such as those available from Cognex Corporation).

With the reference cylinder/sphere shape extracted, the 3D points within the user-specified region of interest are converted to a flattened coordinate space (step 230) by referencing the surface of the reference shape (termed herein the "initial reference surface"). In the flattened space, a point of the 3D point cloud is mapped to a position based on its position relative to the initial reference surface (see further description below). The surface of a cylinder/sphere shape is not flat, and thus, its normal varies from point-to-point in direction around the 3D coordinate space. To accommodate this, the flattening process provides a planar representation of the bended reference surface.

Optionally, the initial reference surface can be further refined (step 240) to capture, and adapt to, the variation of the underlying reference surface which was assumed to be modeled by the provided cylinder/sphere. Results from the refinement process is a quantized reference image represented in the flattened space.

If refinement of the reference surface is not employed as a procedure step, then the reference image is directly obtained by quantizing the flattened surface of the provided cylinder/sphere in the flattened space according to the user-specified sampling distance (i.e., quantization bin size). The reference image represents the underlying reference surface in the flattened space and in a quantized form, with each pixel corresponding to a portion of the actual reference 3D surface in the original point cloud.

A height image is further computed (step 250) with each pixel value representing the average of the heights, where a height represents the distance from the reference cylinder axis or the reference sphere center to a point that is quantized to the pixel. The reference image and the height image represent the same sizes respectively in the X and Y directions, and their pixels have one-by-one correspondence. For pixels that contain no occupying points (i.e., no point is quantized to the 2D cell of the pixel), the pixel values are marked as unoccupied in both the reference image and height image. At an occupied pixel, a height value larger, smaller than, or equal to, its reference value respectively indicates that there exist some points above, below or on the underlying reference surface along the radial direction of the reference cylinder/sphere.

2D blobs are then detected and extracted by processing the height and reference images using the exemplary connected component analysis algorithm (step 260). Each 2D blob corresponds to a 3D subspace in the Client3D space, represented by a 3D blob. The X-Y footprints of a 2D blob determine the projection patch on the underlying reference surface of the 3D blob, while the height of a 2D blob carries the information of the radial distance away from the underlying reference surface. For each 3D blob, its properties such as volume, height, orientation and bounding box can be derived (step 270) by taking into account the reference image, the height image, and the mapping between the flattened space and the client space of the point cloud. This provides a result that can be delivered to a user and/or downstream utilization device/process to perform a function with respect to the imaged object, as described in the examples below.

B. Flattening of the Reference Surface

The following is a description of techniques for flattening a reference surface for a cylinder or a sphere in accordance with step 230 of the procedure 200 in FIG. 2.

i. Flattening a Cylinder's Circular Surface

Figure 3:
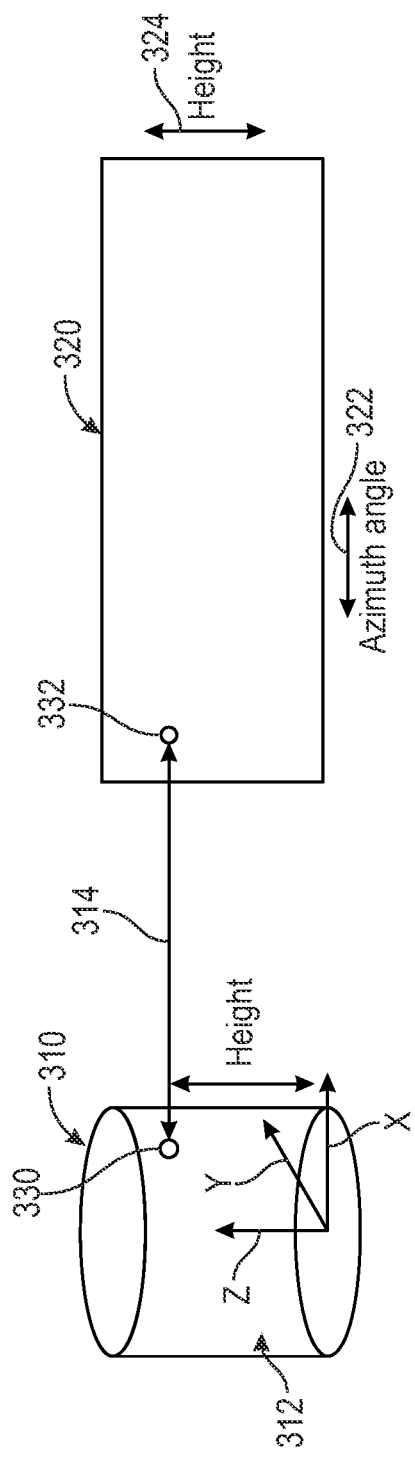
FIGS. 3 and 4 are diagrams showing a generalized procedure for mapping a 3D point cloud of an exemplary cylindrical surface to a 2D representation, and thereby generating a subspace representation therefrom.
Figure 4:
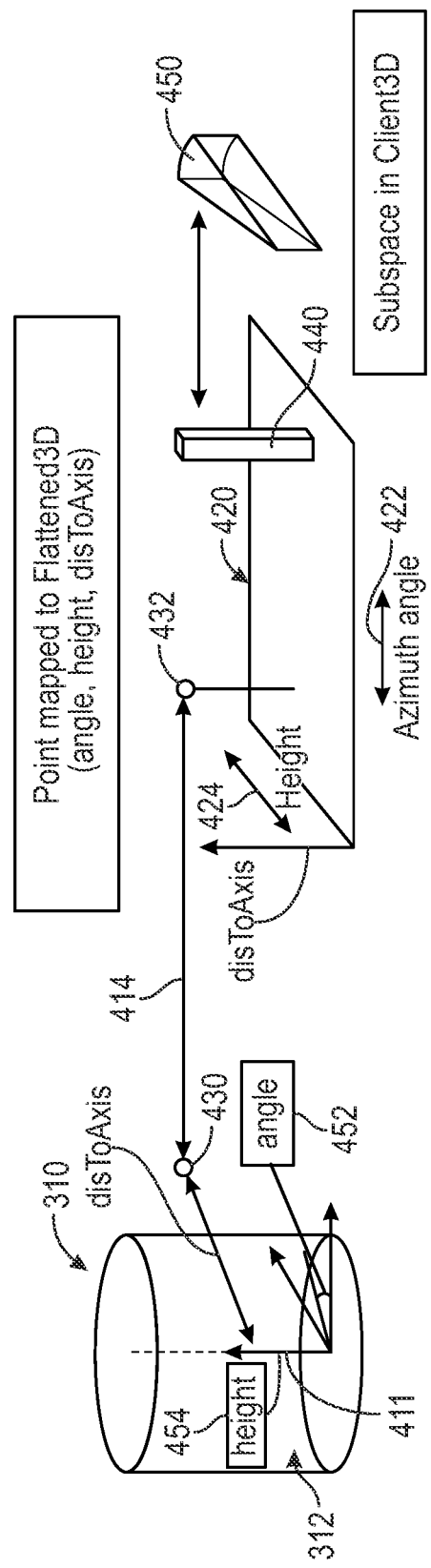

With reference to FIGS. 3 and 4, the circular surface 312 of a cylinder 310 can be unwrapped to define a rectangular shape 320. Given a cylinder, its circularity can be represented by an azimuth (i.e., rotation) angle 322 in the range (in radians) [0, 2π], and a height 324 along the cylinder axis direction in range [0, cylinderHeight]. Hence, the 2D coordinate space 320 is defined to have its X axis aligned to the azimuth axis (i.e., equivalently along the arc direction of the intersection circle of the cylindrical surface 312 with a plane perpendicular to the cylinder axis (corresponding to Z)) and its Y (height) axis 324 aligned to the cylinder's axis. As such, any point 330 on the cylindrical surface 312 will be mapped (double-arrow 314) to a point 332 in the associated azimuth-height plane 320. Additionally, by adding the third Z axis (perpendicular to both the azimuth and height axes) to indicate the perpendicular distance of a point from the cylinder's axis (termed herein "disToAxis"), a new 3D space is established, termed "FlattenedSpace3D" (420 in FIG. 4). Any point 430 in the Client3D space (except those on the axis 411 (Z)) of the cylinder 310 is uniquely mapped (double arrow 414) to a position/point 432 in FlattenedSpace3D 420. Furthermore, the X-Y plane of FlattenedSpace3D 420 is quantized along the azimuth angular direction 422 and the height direction 424 to obtain a new coordinate space, called QuantizedFlattened3D. A Z (disToAxis) column 440 in QuantizedFlattened3D corresponds to a physical radial subspace 450 in Client3D that originates from the cylinder's axis (Z) 411 and has an azimuth angle coverage of the sample angle size 452 and a height coverage of the sample height size 454. The subspace 450 is represented as a wedge herein. The sample angle size and the sample height size can both be derived from the user-provided sample distance used for quantization as part of the user interface or pre-programmed parameters in the vision system. More particularly, the central ray of the physical subspace 450 corresponds to the azimuth angle and the height determined by the center of the bin of the Z column in FlattedSpace3D.

ii. Flattening a Spherical Surface

Figure 5:
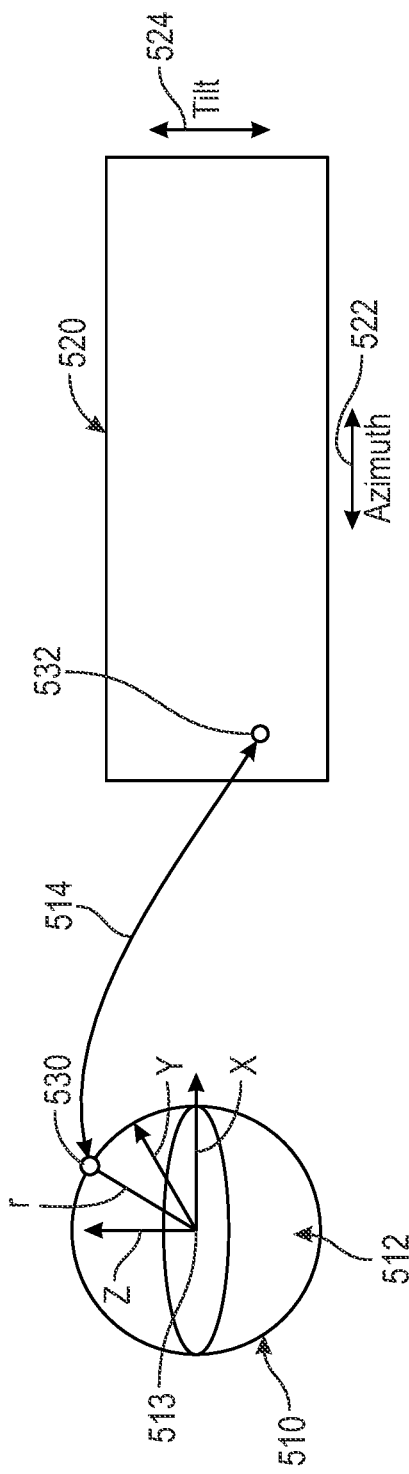
FIGS. 5 and 6 are diagrams showing a generalized procedure for mapping a 3D point cloud of an exemplary spherical surface to a 2D representation, and thereby generating a subspace representation therefrom.
Figure 6:
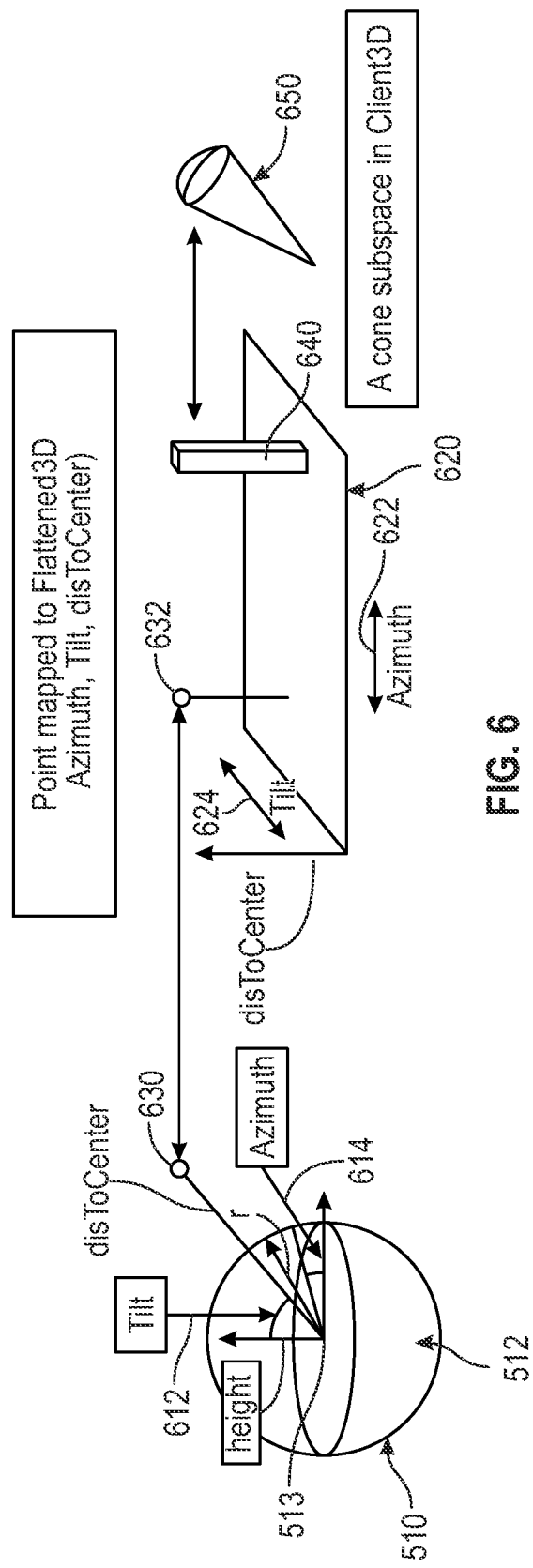

Similarly to the description of FIGS. 3 and 4 above, reference is made to FIGS. 5 and 6, which show a technique for flattening a spherical surface. Given a sphere 510 of radius r, its surface 512 can be unwrapped to define a rectangle shape 520. By way of simplification, the Client3D space is assumed to have its origin at the center 513 of the sphere 510. A point 530 of the sphere surface can be represented by its tilt (612 in FIG. 6) and azimuth (614 in FIG. 6) angles as:

$x = r * \sin(tilt) * \cos(azimuth),$ $y = r * \sin(tilt) * \sin(azimuth),$ $z = r * \cos(tilt)$ where tilt is in the range $[0, \pi]$ and azimuth is in the range $[0, 2\pi]$.

By way of further description, if the sphere is considered analogous to the Earth, then conceptually, the tilt and azimuth directions respectively correspond to the latitude and longitude directions on the (Earth) globe. The 2D coordinate plane 520 is defined using the azimuth axis 522 and the tilt axis 524, where in the context of the Earth the X axis represents the arc direction of a latitude circle and the Y axis represents the arc direction of a meridian of longitude. Any point 530 on the sphere surface 512 can be mapped (double-arrow 514) to a unique point on the azimuth-height plane. Additionally, by adding the third (Z) axis to indicate the Euclidean distance of a point to the sphere center 513 (termed herein "disToCenter"), a new 3D space is established, called FlattenedSpace3D 620 (FIG. 6). Any point 630 in Client3D (except the sphere center 513) is uniquely mapped to a position/point 632 on FlattenedSpace3D 620. As shown, the coordinate space of FlattenedSpace3D 620 defines orthogonal axes of Azimuth 622 (corresponding to the X-axis), Tilt 624 (Corresponding to the Y-axis) and disToCenter (corresponding to a Z-axis), which extends out of the X-Y plane Furthermore, the X-Y plane of FlattenedSpace3D 620 is quantized (to tessellate the sphere surface 512) along the azimuth angular direction 622 and the tilt angular direction 624 to obtain a new coordinate space, QuantizedFlattened3D. An exemplary Z (disToCenter) column 640 in QuantizedFlattened3D corresponds to a cone subspace 650 in Client3D that originates from the center 513 of the sphere 510, and has an azimuth coverage and a tilt coverage of the sample angle size, which is derived from the user-specified sample distance of quantization. The center ray of the cone corresponds to the tilt and azimuth angles determined by the center of the bin of the Z column 640 in QuantizedFlattened3D.

Note that, although in the above illustration the quantization is applied to the tilt and azimuth angles, the disclosed techniques are not limited to these angles, and the techniques contemplated herein support other quantization schemes, e.g., quantization applied to cos(tilt) and azimuth angle to ensure every image pixel (2D cell) representing an equal area patch of the sphere surface.

iii. Flattening Other Curved Surfaces

Although the above described flattening techniques are applied to either a cylindrical or spherical surface, similar techniques can be provided for other geometrical 3D shapes. For example, if a ring torus is used as the reference (e.g., to model the surface of a tire), its surface can be flattened such that the X dimension corresponds to the arc on the (large) circle made of the centers of the intersection (small) circles of the ring torus with any plane that passes through the central rotating axis of the ring torus while the Y dimension corresponds to the arc on an intersection (small) circle.

Figure 7:
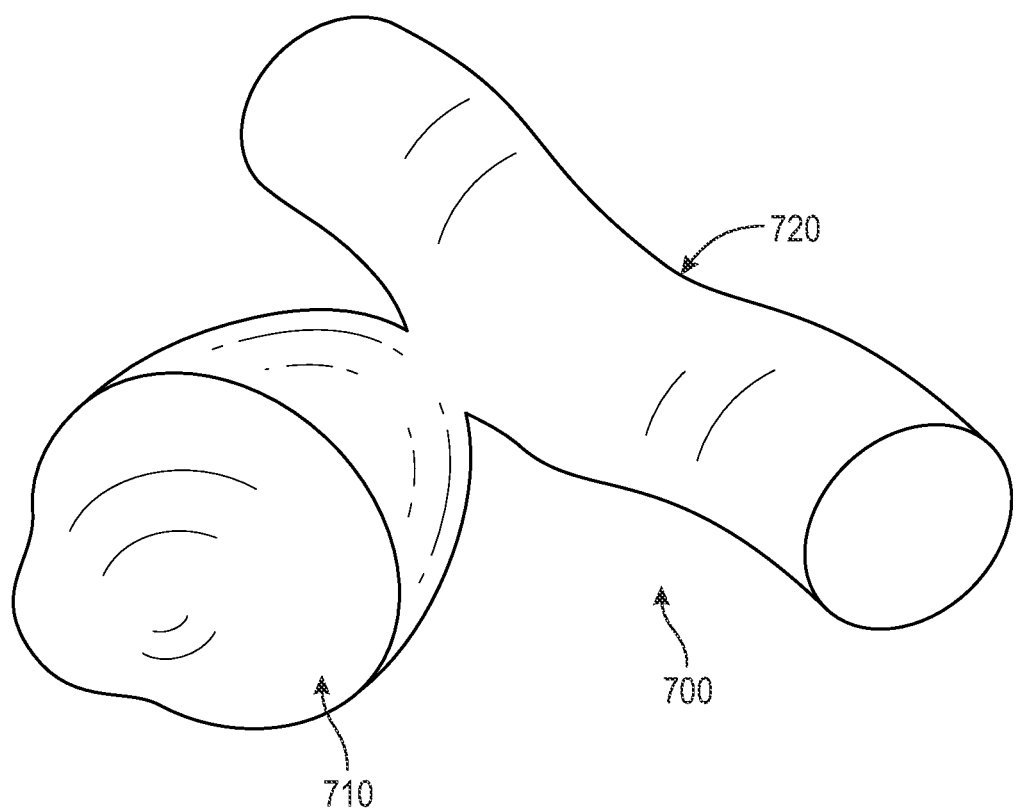
FIG. 7 is a diagram of an exemplary shape containing spherical and cylindrical elements that can be evaluated using the system and method herein.

Hence, the above techniques do not require the actual underlying surface to be precisely represented by a cylinder/sphere. When the input cylinder/sphere is unable to properly match the surface from the input point cloud, the techniques herein can properly detect 2D and 3D blobs as long as the surface represented by the input point cloud is smooth while appearing monotonic when viewed from the outward radial direction of the cylinder axis or the sphere center. This is achieved by the refinement of the reference surface (as described below), which can modify the initial reference surface of the input reference shape to match the underlying practical surface of the point cloud using the reference image. If the curved surfaces can be partitioned properly into multiple patches, each of which has its underlying surface being smooth and monotonic from a cylinder/sphere view, the disclosed methods can be applied to detect blobs for each surface patch. Such a surface is shown in FIG. 7, in which an underlying sphere 710 and a cylinder 720 are identified by the system, and can be extracted and projected into a flattened plane, accordingly.

C. Refining the Underlying Reference Surface

Figure 8:
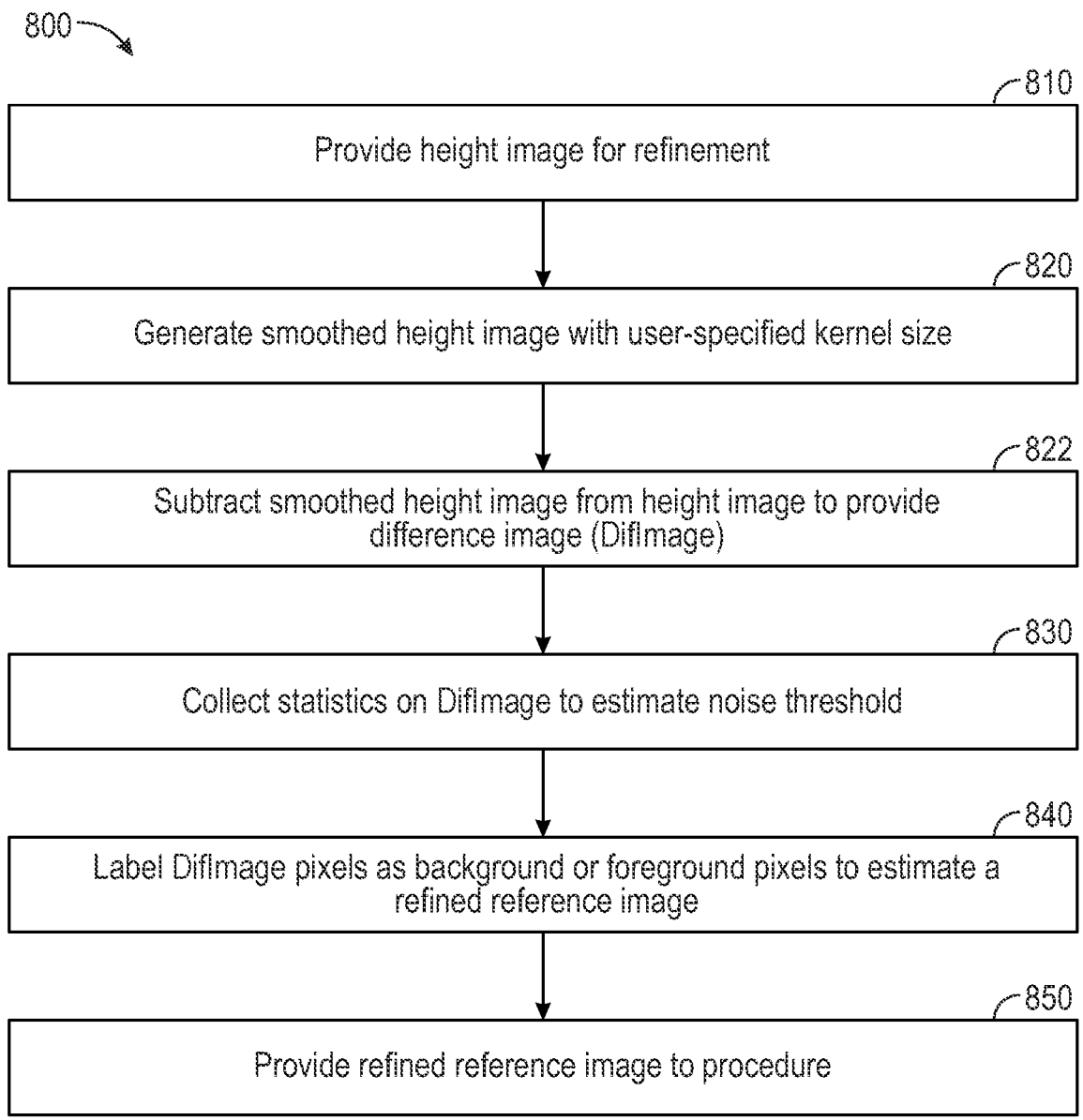
FIG. 8 is a flow diagram showing an optional procedure for refining a reference image for use in the procedure of FIG. 2.
Figure 9:
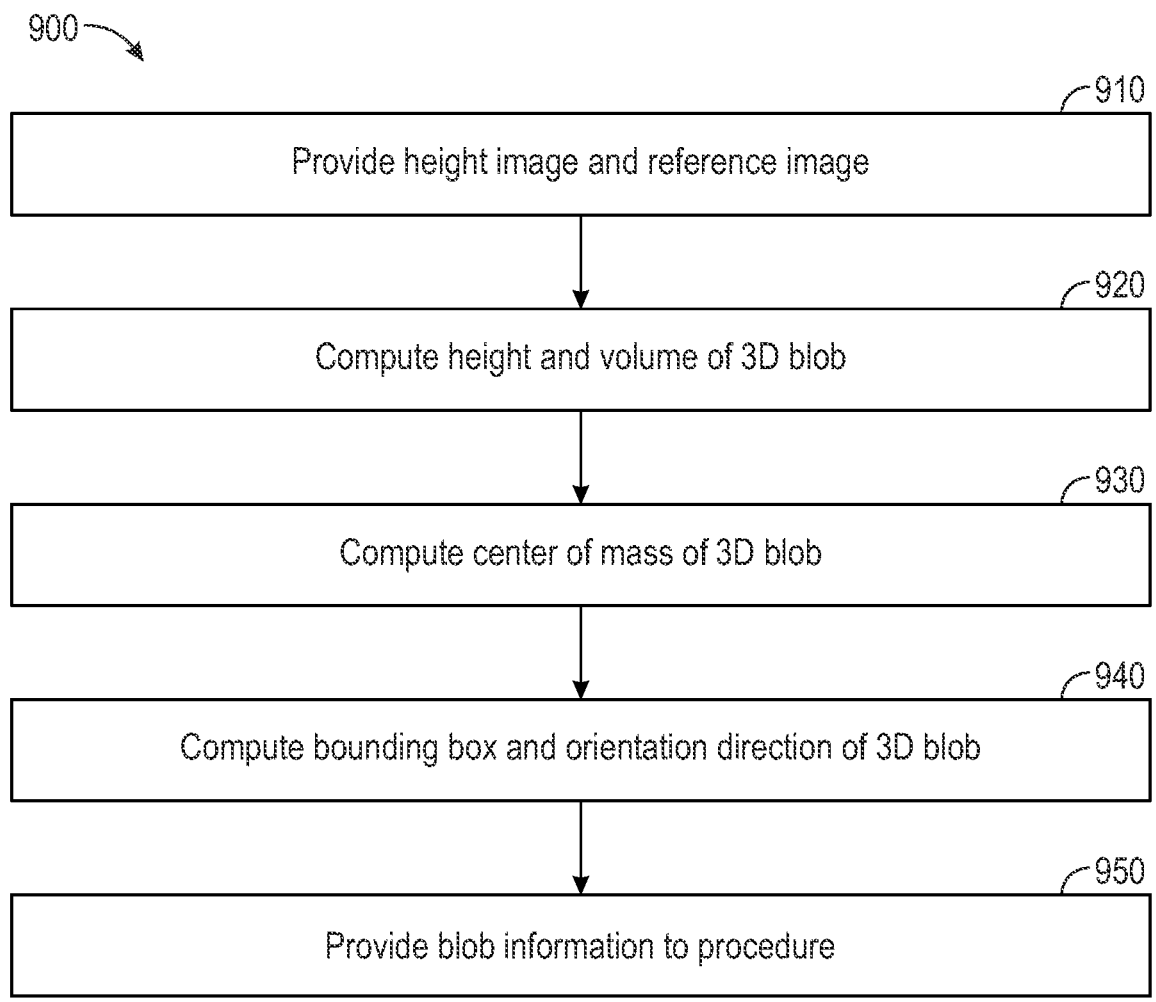
FIG. 9 is a flow diagram of an overall 3D blob generation procedure for use in the procedure of FIG. 2.

As described above, optional refinement of the reference surface can be undertaken. This processing step is provided to handle low-frequency variations of run-time reference surface to correct deformation of the input reference model from the actual underlying surface represented by the 3D point cloud. Such refinement is performed in the quantized flattened space by processing the height image (termed herein "HeightImage"). Referring to FIG. 8, the height image is provided (step 810) and given a user-specified kernel size (termed herein "kernel Size"), the refinement procedure 800 computes a smoothed height image (SmoothedHeightImage) using 0.5*kernel Size in both X and Y dimensions (step 820) and subtracts it from HeightImage to obtain the absolute difference image (DifImage) (step 822). The procedure 800 then collects statistics information of DifImage over all (e.g.) 3×3 fully occupied kernels to estimate a noise threshold (thrd) in step 830. The procedure labels DifImage pixels as background and foreground pixels by testing whether its pixel value is greater than thrd. Based on the two groups of pixels, background and foreground pixels, a second reference image (called RefinedReferenceImage) is estimated in step 840 to serve as the refined reference image. The following options can be used to perform step 840:

a. Average mode: estimate the refined reference image by averaging the heights over the user-specified kernel size in HeightImage. If at a foreground position the kernel does not cover any occupied pixels, its kernel size increments by 2 until to cover some occupied pixels for average computation;

b. Median mode: construct the refined reference image by: 1) taking pixel value from HeightImage for each of the identified background pixels, 2) taking the median of the heights within the user-specified kernel size in HeightImage at each identified foreground pixel location; and/or c. Plane mode: construct the refined reference image using following steps:

(a) take pixel value from HeightImage for each of the identified background pixels; (b) connect foreground pixels into groups based on their X-Y adjacency and for each group gather its nearby identified background pixels in HeightImage and use them to fit a plane; and (c) estimate the height from the fitted plane at each foreground pixel of the group and use it as the pixel value of RefinedReferenceImage.

Additionally, for these three modes the user-provided kernel size (kernel Size) is upper-bounded internally under the assumption that the majority of the 3D point cloud can support the geometry of the reference surface, i.e., blobs (e.g., bumps and dents) are never expected to take over 50% or more of the entire 3D points in the region of interest. Having computed the refined reference surface, its data is provided to the overall procedure 200 described above (step 850).

D. Detecting 2D Blobs in QuantizedFlattened3D Space

The exemplary connected component analysis technique of the overall procedure 200 is carried out on the height image (against ReferenceImage or RefinedReferenceImage if refinement (FIG. 8) is adopted) to group the neighboring occupied pixels of the same type together to form 2D blobs. Blob types include Positive, Negative and Unchanged. A Positive, Negative or Unchanged blob is constructed of the occupied pixels that are respectively above, below, or on the reference surface (represented by the reference image), while they are directly or indirectly connected according to the adjacency of (e.g.) 8 nearest neighborhood (8NN) points defined in the X-Y 2D domain. According to 8NN, two pixels are considered adjacent if their X or Y coordinates differ at most 1.

Additionally, if the reference image is constructed from the refinement process it can be used to detect the blobs of a type missing so as to indicate that missing holes exist on the underlying reference surface. To obtain robust results of 2D blobs, a tolerance height is used to define the minimum distance by which a Positive or Negative pixel must be apart from its corresponding reference pixel value. Its value should be configured to depend on the noise level of the point cloud and the minimum deviation of a blob expected to be detected from the reference surface.

E. Computing Basic Properties of 3D Blobs

The following is a description of a procedure 900 for deriving basic properties of 3D blobs. The procedure 900 processes data of relative to the height image and the reference image, which are input in step 910. By way of illustration, the following definitions can apply to each of the variables used in the computation herein:

(a) h is the pixel value of HeightImage to indicate the average of the radial distances from the cylinder axis or sphere center to the points that are binned to the pixel under consideration;

(b) r is the pixel value of ReferenceImage to indicate the average of the radial distance from the cylinder axis or the sphere center to the underlying surface corresponding to the pixel point under consideration;

(c) sampleDistance is the sample distance used to obtain QuantizedFlattened3D, i.e., the bin size used for quantization; and (d) sampleAngle=sampleDistance/referenceRadius, where referenceRadius is the radius of the reference cylinder or sphere.

i. Computing Height and Volume of 3D Blob

In step 920 of the procedure 900 each occupied pixel in the input HeightImage and ReferenceImage corresponds to a subspace in Client3D space. Its height (span along the radial direction) is h−r. With a cylinder reference, its volume is computed as:

$$(h^2-r^2)*sampleAngle*sampleDistance*0.5, \text{ and}$$

with a sphere reference, its volume is computed as:

$$sampleAngle*(\cos(t0)-\cos(t1))*(h^3-r^3)/3,$$

where [t0, t1] indicates the tilt range of the pixel/bin under consideration and t1−t0=sampleAngle.

The height of a 3D blob is defined as the maximum height over all its occupied pixels. The total volume of a 3D blob is the sum of the maxima over all its occupied pixels.

ii. Computing Center of Mass of 3D Blob

In step 930 of the procedure 900, the center of the mass of a 3D blob is then computed as the average of first moments of the X, Y and Z positions weighted by the mass (volume) over the occupied subspaces in Client3D.

iii. Compute 3D Blob Orientation Direction and Bounding Box

Given a 3D blob under analysis, in step 940 the procedure 900 defines its up orientation direction as the radial direction starting from the cylinder axis or the sphere center to the center of mass of the blob. The procedure then constructs a plane (termed herein a "base plane") that passes through the center of the mass and has its normal aligned to the blob's up orientation. The procedure 900 then uses this information to establish a coordinate space (termed "Plane3D"), such that its XY plane is on the base plane.

When a blob is extracted, for each occupied Z column both its centers of top and bottom surface bins in QuantizedFlattened3D are collected (i.e., derived from HeightImage and ReferenceImage/RefinedReference Image). The surface centers are then mapped to the Plane3D coordinate space and their respective X and Y components are used to extract a minimum-area rectangle. The bounding box of the blob is defined such that its respective X and Y dimensions and sizes align to, and match, the two sides of the minimum-area rectangle, while its respective Z dimension is aligned to the up orientation defined above and bounds by the projections of the blob's top and bottom surface centers on the Z direction. The resulting, analyzed blob is provided to the overall procedure 200 in step 950, where it is used to determine a potential defect or other feature on a cylindrical, spherical or related 3D surface.

III. OPERATIONAL EXAMPLES

Figure 10:
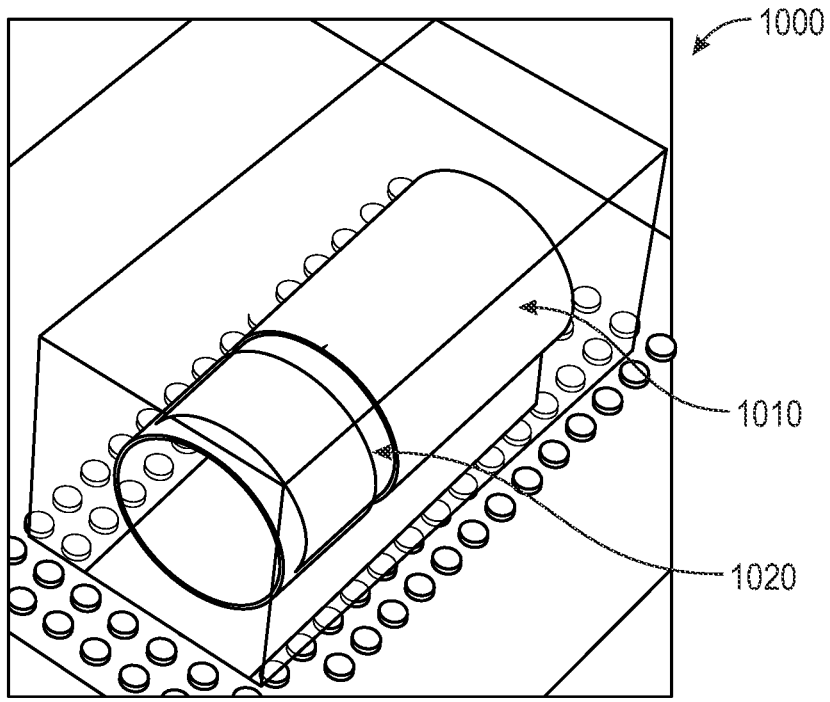
FIGS. 10-12 are images representing a 3D point cloud of an exemplary cylindrical object showing operation of the system and method to evaluate the surface and locate an annular slot thereon.
Figure 11:
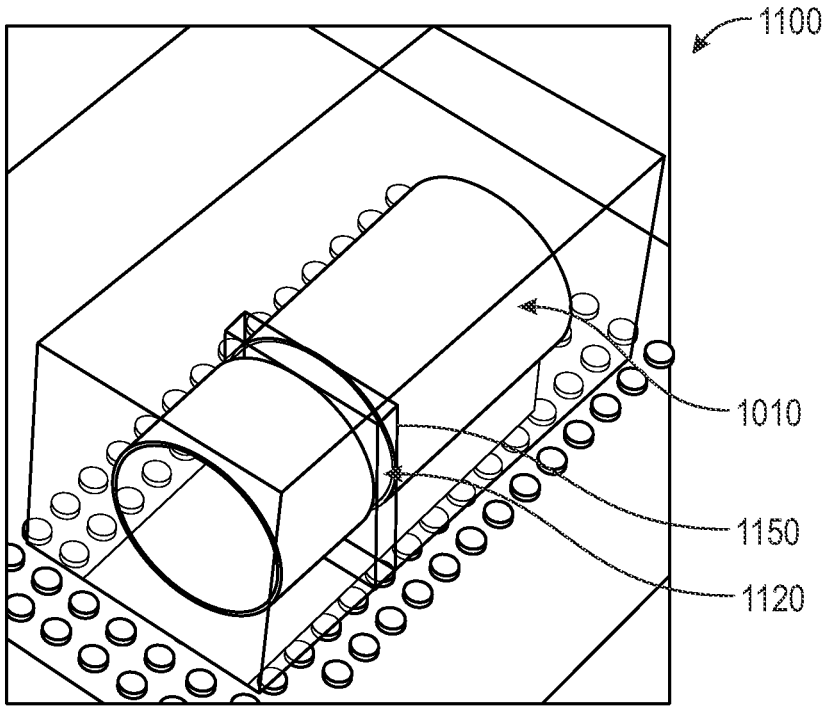
Figure 12:
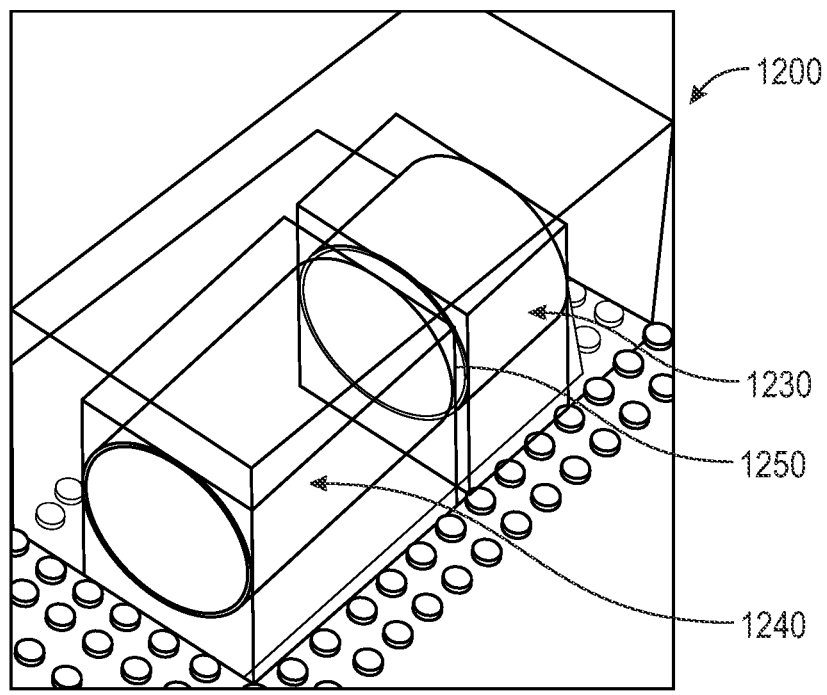

FIGS. 10-21 depict various operational examples in which the above-described system and method for evaluating cylindrical and spherical surfaces from 3D point clouds can be employed to inspect objects with such geometry. FIG. 10 shows an exemplary display 1000 representing a 3D point cloud image of a cylinder 1010. The image includes a recessed, annular slot 1020. The system and method is operated to identify the slot 1020, as containing points that reside below the radius of the surrounding cylinder surface as shown by the highlighted region 1120 in the display 1100 of FIG. 11. Note that the highlighted region can contain an associated bounding box 1150. As shown in the display 1200 of FIG. 12, the analysis of the cylinder surface can also be used to highlight the regions 1230 and 1240 of the surface cylinder 1010 that surround the region 1250 of the slot. The regions 1230 and 1240 are characterized by a normal or expected cylinder height and are bounded by associated bounding boxes that exclude above-described bounded region 1150. The slot 1020 can be an expected feature, or an unexpected defect—with downstream utilization devices and processes (such as a part reject function) operating accordingly when the slot is detected.

Figure 13:
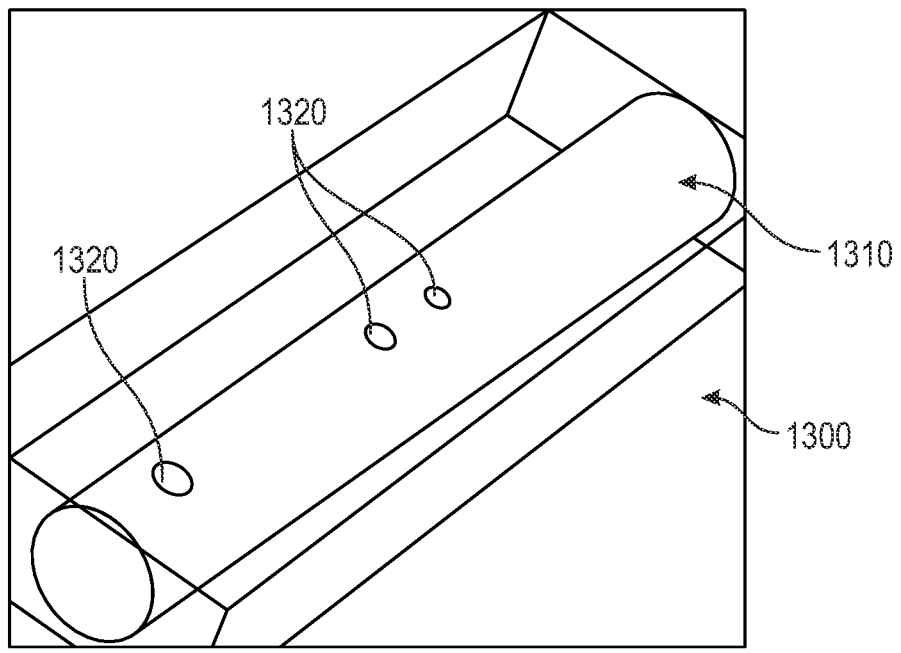
FIGS. 13-15 are images representing a 3D point cloud of an exemplary cylindrical shaft showing operation of the system and method to evaluate the surface and locate dents and dimples thereon.
Figure 14:
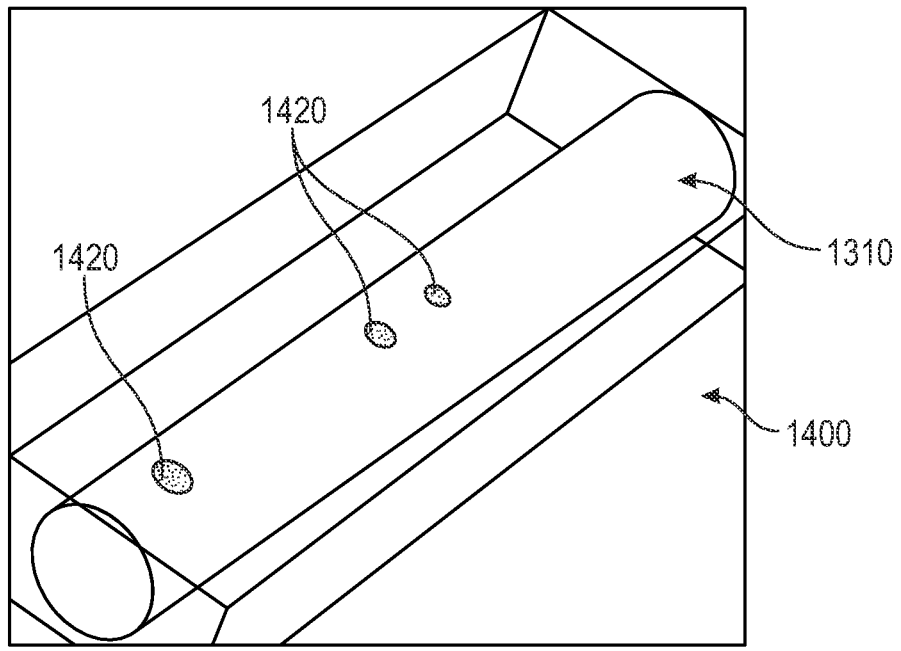
Figure 15:
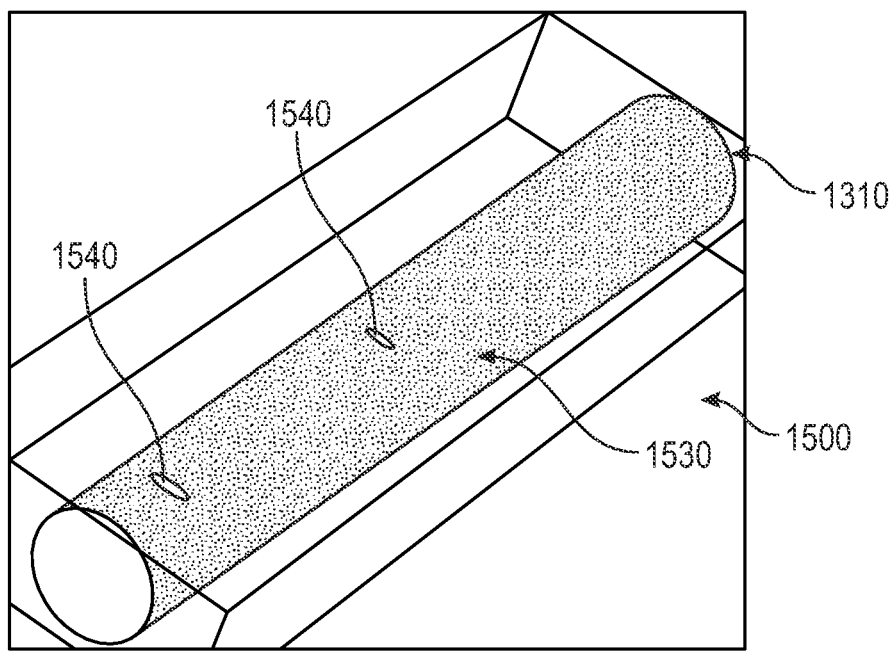

With reference to FIG. 13, the exemplary display 1300 shows a representation of a 3D point cloud image of an elongated cylindrical shaft 1310, which can be a paintbrush handle, or any other cylindrical item under inspection. The shaft includes undesirable dents or defects 1320 of various depth and size. The system and method evaluate the shaft 1310 and, as depicted in the display 1400 of FIG. 14, provides highlights 1420 if the defects as falling below the surrounding shaft surface depth. A downstream utilization process or device can decide, based upon size and/or depth, whether the defects are acceptable or unacceptable. Another display 1500 in FIG. 15 shows the surrounding shaft as a highlighted region 1530. Significant defects 1540 are depicted as un-highlighted.

Figure 16:
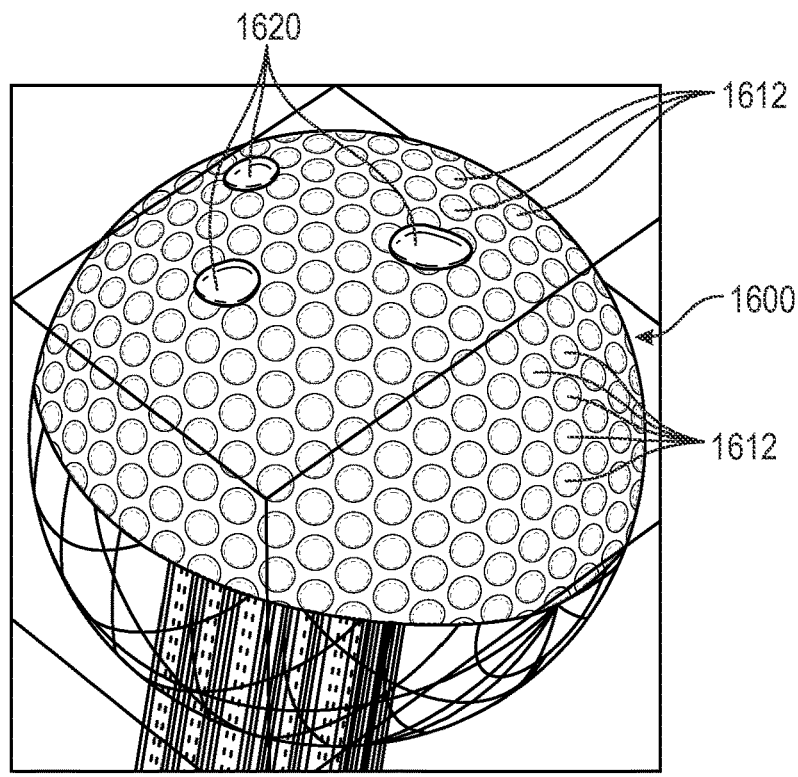
FIGS. 16-18 are images representing a 3D point cloud of an exemplary spherical golf ball with tessellated dimples showing operation of the system and method to evaluate to surface and locate imperfections in the form of protuberances thereon.

FIG. 16 is a display 1600 representing a 3D point cloud image of an exemplary golf ball 1610. It is recognized that a typical golf ball includes tessellated dimples 1612 about its entire surface that have a generally uniform size (diameter), depth and spacing. The system and method can be adapted to disregard such variations in surface depth. There exist a plurality of defects, in the form of outward protuberances 1620.

Figure 17:
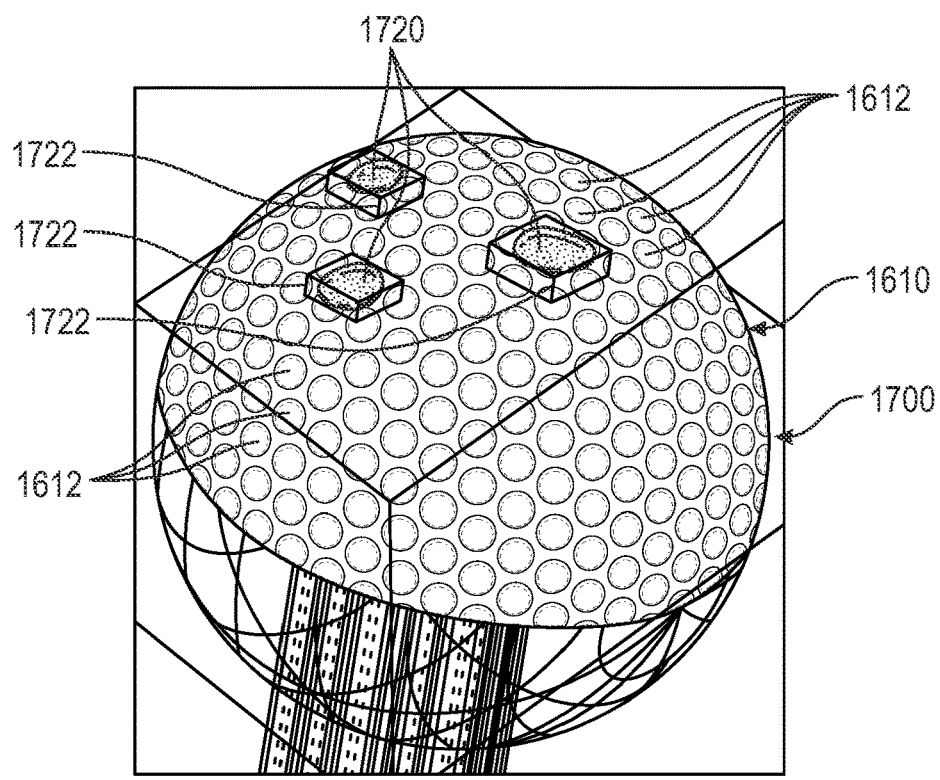
Figure 18:
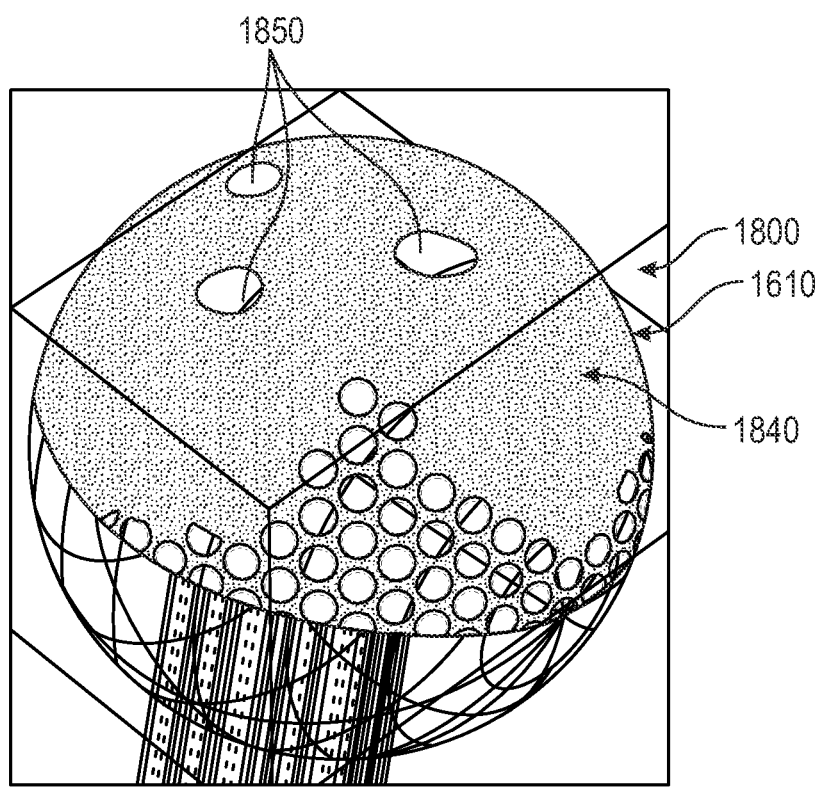

In the exemplary display 1700 of FIG. 17, the ball 1610 is shown with the protuberances highlighted via the system and method. These identified features (blobs) 1720 are bounded by boxes 1722 as shown. The system and method identifies these features 1720 as outside the ball surface. In FIG. 18, the exemplary image 1800 depicts the highlighted region 1840 of the normal ball surface, with the protuberances 1850 excluded from the surface. This information can be provided to an appropriate downstream utilization device or process.

Figure 19:
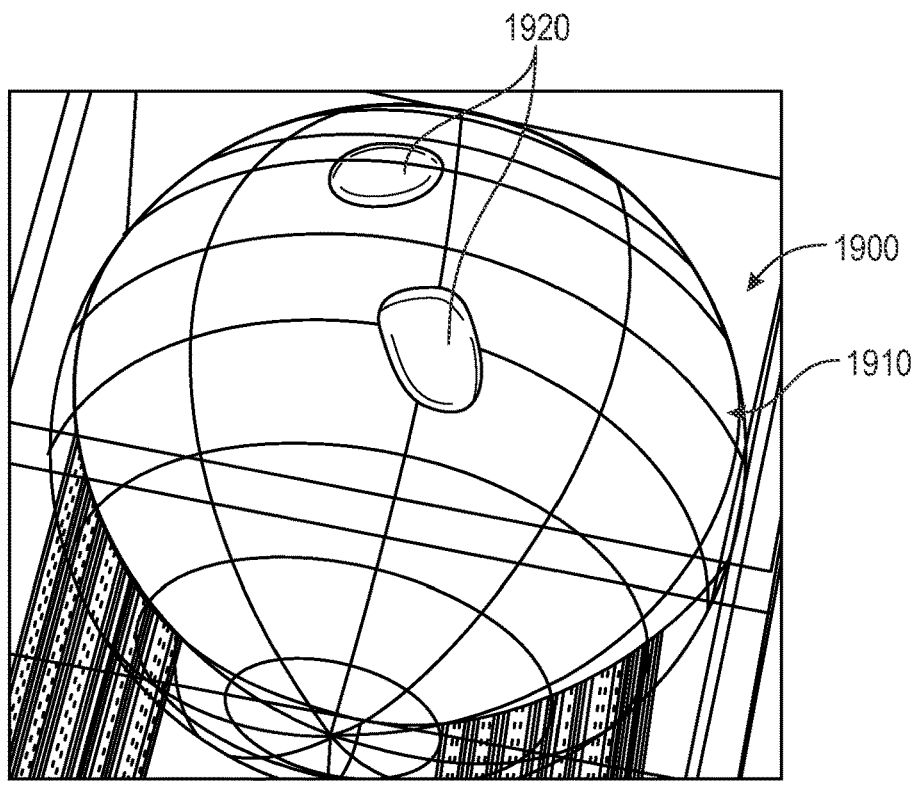
FIGS. 19-21 are images representing a 3D point cloud of an exemplary spherical ping pong ball showing operation of the system and method to evaluate the surface and locate imperfections in the form of dents and/or protuberances thereon.
Figure 20:
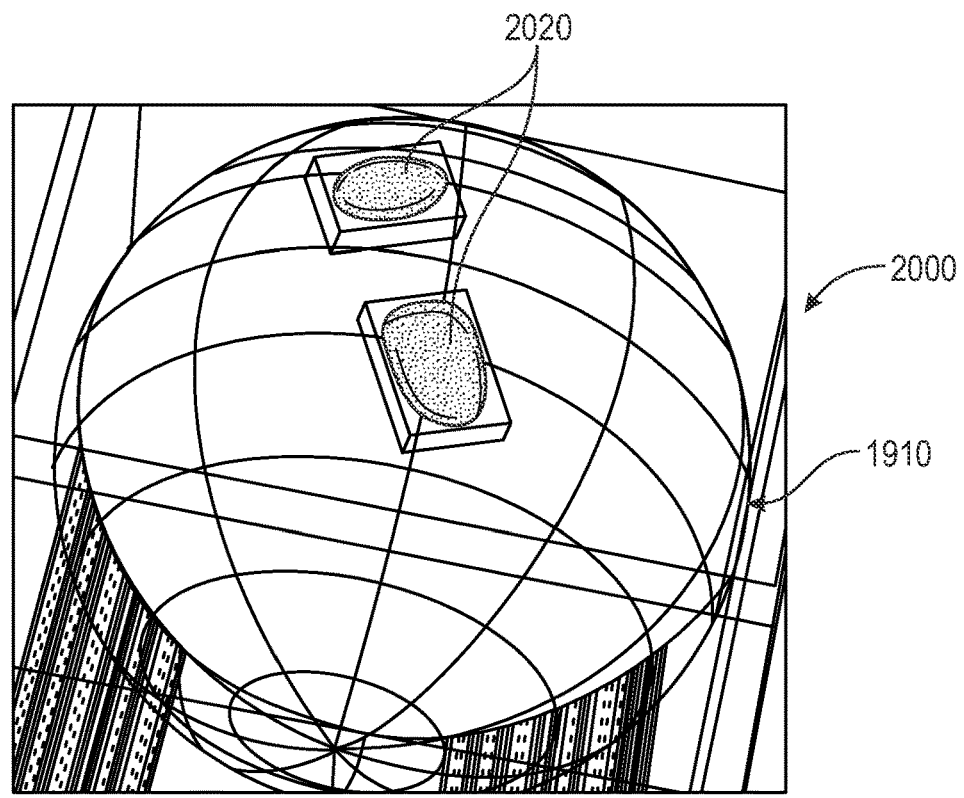
Figure 21:
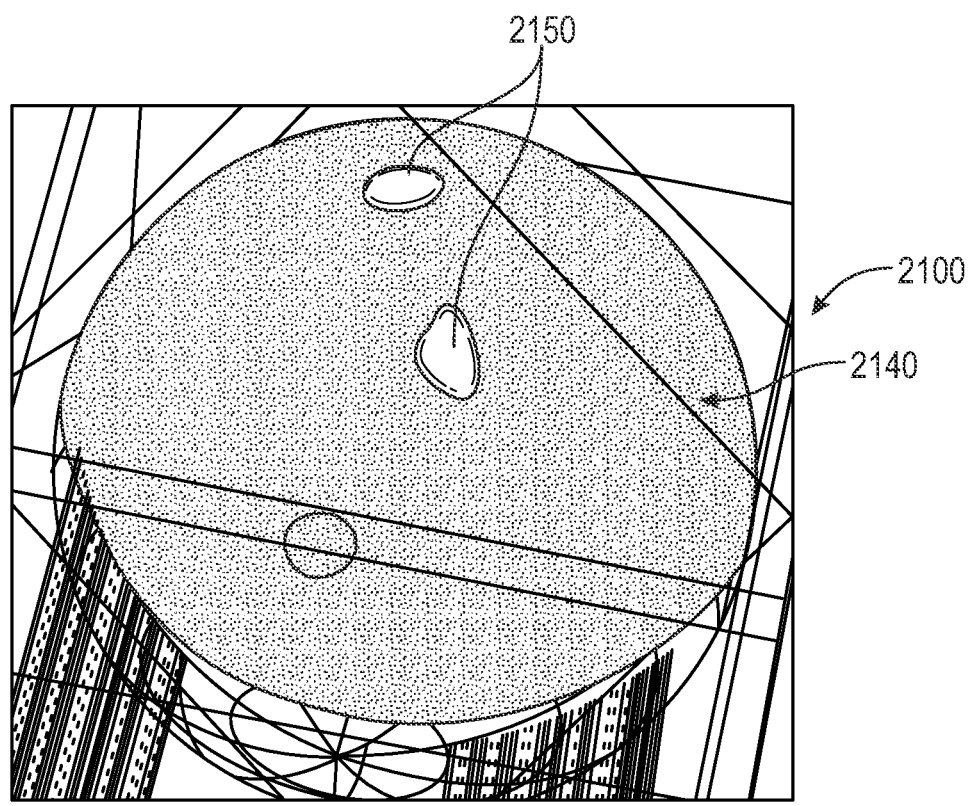

In FIG. 19, an exemplary image 1900 representing a 3D point cloud depicts ping pong ball 1910. The surface of the ball 1910 includes imperfections (dents or swelling) 1920. In FIG. 20, the system and method identifies blob related to the imperfections and generates highlighted regions 2020, as shown in the exemplary image 2000. Hence, in the exemplary image 2100 of FIG. 21, the regions 2150 corresponding to the imperfections are excluded from the highlighted representation of the ball surface 2140. Where a surface is sufficiently complete/unbroken, it can be evaluated by the system as normal and/or acceptable. However, if sufficiently large regions are absent from the overall surface, then an event can be triggered, such as rejection of a part. A user can set the threshold by which events are triggered.

Note that the above-described operation examples can be used for other tasks, such as alignment with respect to object features (bolt holes, etc.), or to sort different types of objects on a line.

IV. CONCLUSION

It should be clear that the above-described system and method provides an effective solution for detecting and measuring shapes having cylindrical and/or spherical surface topographies and for identifying features (e.g. blobs) on such surfaces that are inconsistent or potentially erroneous. The system and method uniquely operates directly on unorganized and un-ordered points, requiring neither a mesh/surface reconstruction nor voxel grid representation of object surfaces in a point cloud. The system and method herein can adapt and tolerate the deformation of the reference models and produce robust results. They exhibit reasonably fast processing speed and are highly suitable for real-time vision system applications, distinguishing it from the computation-expensive methods that require surface/mesh reconstruction and/or local approximation of the imaged 3D surface. Moreover, the system and method can function in a flexible manner. When the reference model must be held, it can detect any object deviating from a tolerant range of the reference shape. Otherwise, it can handle model variations adaptively, so that the cylindrically or spherically shaped model can include inaccuracies, wherein the run-time point cloud the underlying object surface can be mismatched (to a degree) relative to the reference shape, and the system and method can apply the cylindrically or spherically shaped model so long as the surface under inspection appears monotonic from a cylindrical spherical point of view.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for detecting features relative to curved surfaces from a 3D point cloud imaged by a 3D vision system camera assembly comprising:
   an extraction process that identifies a curved surface in 3D space and provides a reference model relative to the curved surface;
   a flattening process that flattens the curved surface, including a feature thereof, into a flattened, planar shape in accordance with the reference model, wherein a portion of the curved surface is represented as a height image having values representative of distances of the points on the curved surface from a central element of the reference model, wherein the curved surface comprises one or more regions that are monotonic with respect to an outward radial direction from the central element of the reference model;
   a feature location process that locates the feature on the planar shape represented in the height image by processing the planar shape produced from the flattening process with respect to the height image;
   a mapping process that converts the feature located by processing the planar shape into the 3D space; and
   a feature output process that reports, relative to the curved surface, the feature converted to the 3D space.

2. The system as set forth in claim 1 wherein the feature location process employs a blob analysis tool.

3. The system as set forth in claim 1 wherein the curved surface is a cylindrical surface or a spherical surface and the reference model, respectively, comprises a cylinder or a sphere.

4. The system as set forth in claim 1 wherein the flattening process flattens the curved surface along a surface tangent direction.

5. The system as set forth in claim 1 wherein the flattening process divides the planar surface, wherein 3D points of the curved surface reside, into a grid based upon orthogonal axes defining azimuth and height on a cylinder or azimuth and tilt on a sphere.

6. The system as set forth in claim 1, further comprising, a feature identification process that identifies features differing from a normal surface geometry of the curved surface.

7. The system as set forth in claim 6 wherein a differing feature comprises an object defect including at least one of a deformation, a protrusion, a dent, a dimple, or a scratch.

8. The system as set forth in claim 1, further comprising, a reference surface refinement process that adapts the reference model to 3D points representing the planar surface.

9. The system as set forth in claim 8, wherein the reference surface refinement process adapts the reference model based on an estimated noise threshold derived from the height image.

10. The system as set forth in claim 9, wherein the estimated noise threshold is arranged to distinguish foreground pixels from background pixels of the height image.

11. A method for detecting features relative to curved surfaces from a 3D point cloud imaged by a 3D vision system camera assembly comprising:
    identifying a curved surface in 3D space and providing a reference model relative to the curved surface;
    flattening the curved surface into a flattened, planar shape in accordance with the reference model, wherein a portion of the curved surface is represented as a height image having values representative of distances of points on the curved surface from a central element of the reference model, wherein the curved surface comprises one or more regions that are monotonic with respect to an outward radial direction from the central element of the reference model;
    locating a feature on the planar shape represented in the height image by processing the planar shape produced from the flattening process with respect to the height image;
    mapping the located feature into the 3D space; and
    reporting the located feature relative to the curved surface.

12. The method as set forth in claim 11 wherein the locating of the feature employs a blob analysis tool.

13. The method as set forth in claim 11 wherein the curved surface is a cylindrical surface or a spherical surface and the reference model, respectively, comprises a cylinder or a sphere.

14. The method as set forth in claim 11 wherein the flattening flattens the curved surface along a surface tangent direction.

15. The method as set forth in claim 11 wherein the flattening divides the planar surface, wherein 3D points of the curved surface reside, into a grid based upon orthogonal axes defining azimuth and height on a cylinder or azimuth and tilt on a sphere.

16. The method as set forth in claim 11, further comprising, identifying a feature differing from a normal surface geometry of the curved surface.

17. The method as set forth in claim 16 wherein the differing feature comprises an object defect including at least one of a deformation, a protrusion, a dent, a dimple, or a scratch.

18. The method of claim 11, wherein the reporting comprises outputting a 3D graphical representation of the located feature relative to the curved surface.

19. A system for detecting object features within an industrial process, the process comprising:
    a 3D vision system camera including an image sensor and a field of view (FOV), and configured to acquire a 3D point cloud representative of an object within the FOV; and
    at least one processor in communication with the 3D vision camera and configured to:
    receive the 3D point cloud representative of the object;
    identify, from the 3D point cloud, a curved surface in 3D space;
    provide a reference model relative to the curved surface;
    flatten the curved surface, including a feature thereof, into a flattened, planar shape in accordance with the reference model, wherein a portion of the curved surface is represented as a height image having values representative of distances of points on the curved surface from a central element of the reference model, wherein the curved surface comprises one or more regions that are monotonic with respect to an outward radial direction from the central element of the reference model;
    locate the feature on the planar shape within the height image by processing the planar shape with respect to the height image;

convert the located feature in to the 3D space; and
output the located feature relative to the curved surface within the 3D space.

20. The method of claim 18, wherein the 3D graphical representation includes at least one of a highlighted region or a bounding box corresponding to the located feature.

\* \* \* \* \*